(12) United States Patent
Linda et al.

(10) Patent No.: US 11,436,294 B2
(45) Date of Patent: Sep. 6, 2022

(54) DISAMBIGUATING SEARCH QUERIES

(71) Applicant: Expedia, Inc., Bellevue, WA (US)

(72) Inventors: Ondrej Linda, Sammamish, WA (US);
Ka Ming Chan, Cupertino, CA (US);
Prashanth Kotte Prakasam, Redmond, WA (US); Ananth Lingamneni, Seattle, WA (US); Shane William Myrick, Seattle, WA (US); Sangwa Simfukwe, Seattle, WA (US)

(73) Assignee: Expedia, Inc., Bellevue, WA (US)

( * ) Notice: Subject to any disclaimer, the term of this patent is extended or adjusted under 35 U.S.C. 154(b) by 408 days.

(21) Appl. No.: 16/517,301

(22) Filed: Jul. 19, 2019

(65) Prior Publication Data

US 2019/0340211 A1 Nov. 7, 2019

Related U.S. Application Data (63) Continuation of application No. 14/811,446, filed on Jul. 28, 2015, now Pat. No. 10,360,276.

(51) Int. Cl.
  *G06F 16/9537* (2019.01)
  *G06F 16/29* (2019.01)
  (Continued)

(52) U.S. Cl.
  CPC ........ *G06F 16/9537* (2019.01); *G06F 16/248* (2019.01); *G06F 16/285* (2019.01);
  (Continued)

(58) Field of Classification Search
  CPC ............. G06F 16/9537; G06F 16/9538; G06F 16/9035; G06F 16/909; G06F 16/9038;
  (Continued)

(56) References Cited

U.S. PATENT DOCUMENTS 8,781,898 B1 * 7/2014 Yagnik ............... G06Q 30/0251
  705/14.54
8,914,366 B1 * 12/2014 Li ........................... G06F 16/35
  707/739

(Continued)

FOREIGN PATENT DOCUMENTS

EP   2 541 487 A1   1/2013
JP   2012-256268   12/2012
(Continued)

OTHER PUBLICATIONS

Office Action received in CN Application No. 201680043993.8 dated Jul. 23, 2021.

(Continued)

*Primary Examiner* — Phong H Nguyen
(74) *Attorney, Agent, or Firm* — Knobbe, Martens, Olson & Bear, LLP (57) ABSTRACT

A network-based service is disclosed for disambiguating search queries based on a location-based clustering of search results corresponding to the query. In one embodiment, a user may submit a query for travel items, such as hotel accommodations. The service can determine, based on the query, an initial set of hotels providing such accommodations. The service can then cluster the hotels according to their geographic positions. If the service identifies multiple clusters, the user can be prompted to select a specific cluster to receive additional information regarding the cluster. Illustratively, if a user submits a query for a hotel in "Springfield," the service may ask the user to select among multiple clusters of results, each corresponding to a different city named "Springfield" in which results have been located.

20 Claims, 6 Drawing Sheets

(51) Int. Cl.
  *G06F 16/248* (2019.01)
  *G06F 16/28* (2019.01)
  *G06F 16/9535* (2019.01)
  *G06F 16/9538* (2019.01)
  *G06F 16/9035* (2019.01)
  *G06F 16/909* (2019.01)
  *G06F 16/9038* (2019.01)
  *G06F 16/906* (2019.01)
  *G06F 16/9536* (2019.01)
  *G06N 7/00* (2006.01)

(52) U.S. Cl.
  CPC .......... *G06F 16/29* (2019.01); *G06F 16/906* (2019.01); *G06F 16/909* (2019.01); *G06F 16/9035* (2019.01); *G06F 16/9038* (2019.01); *G06F 16/9535* (2019.01); *G06F 16/9538* (2019.01); *G06F 16/9536* (2019.01); *G06N 7/005* (2013.01)

(58) Field of Classification Search
  CPC ...... G06F 16/906; G06F 16/29; G06F 16/248; G06F 16/285; G06F 16/9535; G06F 16/9536
  USPC .................. 707/722, 723, 736, 737, 769
  See application file for complete search history.

(56) References Cited

U.S. PATENT DOCUMENTS

| | | | | |
|---|---|---|---|---|
| 2008/0097873 A1* | 4/2008 | Cohen | ................ | G06Q 30/0603 705/26.1 |
| 2009/0024597 A1* | 1/2009 | Imielinski | ........... | G06F 16/9032 707/999.006 |
| 2009/0228339 A1 | 9/2009 | Wolf et al. | | |
| 2009/0287546 A1* | 11/2009 | Gillespie | ................ | G06Q 50/12 707/999.005 |
| 2010/0088314 A1* | 4/2010 | Kuang | .................. | G06F 16/951 707/E17.014 |
| 2011/0022423 A1* | 1/2011 | Shank | ................ | G06Q 30/0239 707/E17.014 |
| 2011/0270884 A1 | 11/2011 | Li et al. | | |
| 2012/0254186 A1* | 10/2012 | Winner | ................... | G06F 16/29 707/E17.09 |
| 2013/0031506 A1* | 1/2013 | Diaz | ..................... | G06Q 50/12 715/781 |
| 2013/0124564 A1* | 5/2013 | Oztekin | .................. | G06Q 10/02 707/E17.014 |
| 2013/0218687 A1* | 8/2013 | Sohangir | ............ | G06F 16/9535 705/14.66 |
| 2014/0163854 A1* | 6/2014 | Matsumoto | ........ | G01C 21/3469 701/123 |
| 2014/0214461 A1* | 7/2014 | Diliberto | ............ | G06Q 30/0201 705/5 |
| 2014/0289006 A1* | 9/2014 | Palmer | .................. | G06F 16/243 705/7.31 |
| 2014/0358910 A1* | 12/2014 | Frigon | ................ | G06F 16/9038 707/723 |
| 2015/0073941 A1* | 3/2015 | Burrows | ............ | G06Q 30/0639 705/26.62 |
| 2015/0161271 A1* | 6/2015 | Gur | ..................... | G06F 16/9537 707/728 |
| 2015/0168150 A1 | 6/2015 | Kahn et al. | | |
| 2016/0055543 A1* | 2/2016 | Palmer | ............... | G06Q 30/0269 705/14.54 |
| 2016/0125320 A1 | 5/2016 | Metzger et al. | | |

FOREIGN PATENT DOCUMENTS

| | | |
|---|---|---|
| JP | 2013-182341 | 9/2013 |
| JP | 2015-102805 | 6/2015 |
| JP | 6790067 | 11/2020 |
| WO | WO 2015/039057 A4 | 3/2015 |
| WO | WO 2017/019304 | 2/2017 |

OTHER PUBLICATIONS

International Search Report and Written Opinion received in PCT/US2016/042145 dated Sep. 27, 2016.
Extended European Search Report received in EP Application No. 16831024.1 dated Mar. 7, 2019.
International Preliminary Report on Patentability received in PCT/US2016/042145 dated Jan. 30, 2018.
Office Action received in JP Application No. 2018-504255 dated Apr. 9, 2020.
Office Action received in EP Application No. 16831024.1 dated Feb. 15, 2021.
Office Action received in IN Application No. 201817001517 dated Mar. 30, 2021.

* cited by examiner

DISAMBIGUATING SEARCH QUERIES

BACKGROUND

Computing devices and computing networks are frequently employed by users to obtain information on a variety of topics. Due to the breadth of information provided, many network-based systems enable users to search for information on those systems. Commonly, users are enabled to submit structured or unstructured queries to a network-based system, which the system then attempts to match to a set of potential search results. Due to their ease of use, unstructured queries, such as freeform text strings, are often preferred by users. However, due in part to their unstructured nature, these queries are often ambiguous, and therefore result in at least partially irrelevant search results being provided to a user.

For example, a user interested in locating information on hotel accommodations in the city of Springfield, Mo., may search a network-based service using the query string "hotels in springfield." However, the network-based service may be unable to determine from the text of the query which specific city of "Springfield" the user is interested in (e.g., Springfield, Mo., Springfield, Mass., Springfield, Oreg., etc.), or indeed, whether "springfield" denotes a city in the United States at all. Thus, merely executing the query and providing a set of results is highly likely to present irrelevant information to a user, resulting in a decrease in user satisfaction with the system and an increased use of computing resources necessary to service the user.

DETAILED DESCRIPTION

Generally described, aspects of the present disclosure are directed to processing user-submitted queries that may include ambiguous terms or search criteria, and for resolving the ambiguities to provide meaningful and accurate search results to a user. More specifically, aspects of the present disclosure utilize geographic clustering of search results for location-based goods or services (such as hotel accommodations) to determine a set of potential areas or regions in which valid results may be located, and to notify the customer of the various areas or regions. Illustratively, a user of a U.S.-based network travel service may submit a query for "hotels in springfield." The travel service may determine that valid results for the query may include hotels in Springfield, Mo., Springfield, Oreg., or Springfield, Mass. Accordingly, a user may be prompted to select the correct location in which hotel accommodations are desired. As will be described below, the travel service may determine a set of regions including potentially valid results without requiring a literal mapping of terms of the query to specific regions (e.g., without requiring a detection that "springfield" refers to a city, and that cities of that name exist in multiple states). As such, the travel service may be enabled to disambiguate any freeform query. For example, a query for "beach hotels" may result in a detection of potential results in various locations with beaches (e.g., Hawaii, California, Florida, etc.). Similarly, a query for "Edgewater Hotel" may result in a detection of potential hotel accommodations in both Seattle, Wash. (where a hotel named the "Edgewater Hotel" is located) and in the city of Edgewater, N.J. As detailed below, the travel service may therefore be enabled to more quickly and accurately process user queries, resulting in an improved user experience and a reduction in the computing resources necessary to utilize network travel services.

In order to determine a set of areas or regions in which potentially valid results to a query are located, the travel service may utilize results clustering. Specifically, the travel service may initially execute a query to determine a set of results (e.g., in accordance with the algorithms described below, traditional searching algorithms known in the art, or any other searching algorithm). Thereafter, the travel service may determine a geographic location of each search result. For example, the travel service may utilize known address data or latitude and longitude data for each of the set of results to assign a location to the result. The travel service may then cluster the results according to their assigned locations. In one embodiment, results may be clustered based on a simple distance calculation, such that two results within a threshold distance (which may be predefined by the travel service) of one another are placed within the same "cluster," while results more than the threshold distance from any existing cluster are placed in a new cluster. Other clustering algorithms, such as "k-means" clustering, are known within the art and may be utilized to determine clusters of results.

After a set of results clusters are determined, the travel service may assign an identifier to the cluster. In one embodiment, identifiers may be based on existing metadata regarding each result within the cluster. For example, the travel service may maintain a number of geographical identifiers for each result, designating each result's city, county, region, state, country, etc. As such, each cluster may be identified based on the most specific geographical identifier shared by all results within the cluster. Accordingly, a cluster of results in the downtown of Seattle, Wash. may be identified as "Hotels in Downtown Seattle, Wash.," while a cluster of results spread across Rhode Island stage may be identified as "Hotels in Rhode Island."

Thereafter, information regarding the set of determined clusters may be presented to a user in response to their query. For example, a query for "hotels in springfield" may cause the travel service to return an indication that potential results were located in Springfield, Mo., Springfield, Oreg., or Springfield, Mass., and to request that the user select one of those regions in order to display hotel accommodations in the selected region. Thus, a user who initially intended to search for hotel accommodations in Springfield, Oreg. would not be presented with results for hotel accommodations in Springfield, Mo. (which might otherwise be displayed more prominently within a set of search results). Moreover, because the query has been disambiguated based on clustering of results, there is no need for the travel service to attempt to implement separate systems to detect ambiguities in the search criteria before conducting a search. Disambiguation based on clustering thus represents a clear improvement on other disambiguation techniques, such as scanning each query to detect a pre-defined list of potentially ambiguous terms or phrases.

In some embodiments, a travel service may be configured to distinguish between clusters that likely represent an area of interest to a user and clusters that likely include a specific item of interest to a user. For example, a query for "Edgewater Hotel" may result in two clusters: a first including the Edgewater Hotel in Seattle, Wash. as well as other nearby hotels in Seattle, and a second including a variety of hotels in the borough of Edgewater, N.J. While each of the hotels in the first cluster may accurately be described as "Hotels in Seattle, Wash.," such a description may be viewed as unhelpful to a user searching for the specific "Edgewater Hotel" (since such results may appear to be more vague than the initial search). Accordingly, rather than present a region corresponding to the first cluster to the user, the travel service may detect that the Edgewater Hotel included within that cluster is a specific item of interest to the user. As such, the travel service may represent the first cluster of results to the user as corresponding to the Edgewater Hotel in Seattle, and allow the user to select that first cluster in order to view hotel accommodations at the Edgewater Hotel.

In some instances, in addition to or alternatively from explicit user selection of a cluster, user history or other user profile data of a user may be used to distinguish between clusters. For example, where a travel service has a record of a prior purchase of a user in a specific geographic region on a specific date, the travel service may automatically disambiguate additional queries of the user on that specific date by selecting a cluster corresponding to the geographic region. As a further example, where a travel service has a record of a preference of the user for a specific region (e.g., as indicated by repeated past purchases, an explicit indication of a preference for the region, etc.), the travel service may automatically disambiguate queries of the user by selecting a cluster corresponding to the specific region. In some instances, rather than automatically selecting a cluster corresponding to a preferred region, the travel service may utilize user preference for a region to prioritize clusters (e.g., such that a cluster corresponding to a preferred region is displayed above alternative clusters).

As would be appreciated by one of skill in the art, the use of geographic clustering to disambiguate search queries represents a significant advantage over prior implementations. Specifically, the use of geographic clustering enables a reduction in the number of irrelevant results presented to a user, and thus enables a user to search for and locate items of interest more rapidly and efficiently. As such, the use of geographic clustering to disambiguate queries may enable travel services to operate more efficiently, enabling travel services to return relevant query results more quickly and with utilization of fewer computing resources. Moreover, the use of geographic clustering to disambiguate search queries does not require independent analysis of the query itself (e.g., by attempting to match query terms to a known list of potentially ambiguous terms), but rather utilizes the variety of search results matching a query in order to detect ambiguities. As such, the embodiments described herein represent significant advances over existing systems.

Though examples are provided herein with respect to specific types of travel services, such as hotel accommodations, embodiments of the present disclosure may be applied to any geographically-based item or service, including but not limited to flights, accommodations, other transportation, activities, tours, travel insurance, day trips, destination services, or combinations thereof.

Figure 1:
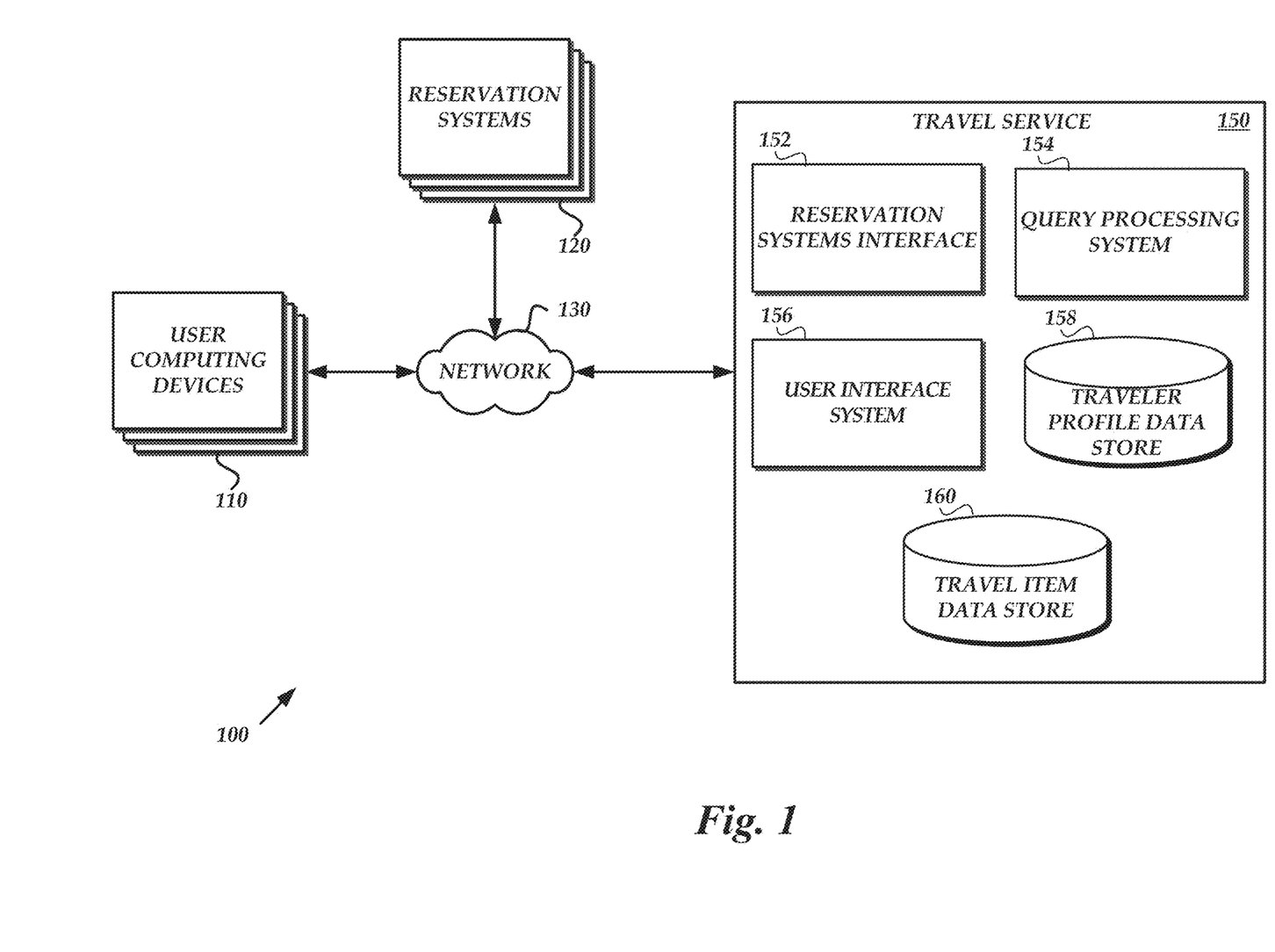
FIG. 1 is a schematic block diagram of an illustrative network environment in which a travel service may operate to enable user submission of queries for travel items and to disambiguate user queries based on geographic clustering of results.

FIG. 1 is a block diagram depicting an illustrative operating environment in which a network-based travel service 150 enables customers to browse, search for, and acquire travel items made available by third party providers or the operator of the travel service 150. As illustrated in FIG. 1, the operating environment includes one or more reservation systems 120 and one or more user computing devices 110 in communication with a network-based travel service 150 via a network 130. A third party provider, using a reservation system 120, may make travel items, or information regarding travel items, available to the travel service 150 via the network 130. The travel service 150 may then make the travel items, as well as other travel items, available to traveler computer devices 110. Accordingly, a prospective traveler, using a user computing device 110, may browse the travel items available from the travel service 150, search travel items, and acquire, reserve, or book one or more desired travel items.

A user computing device 110 may be any computing device, such as a laptop or tablet computer, personal computer, server, personal digital assistant (PDA), hybrid PDA/mobile phone, mobile phone, electronic book reader, set-top box, camera, digital media player, and the like. The reservation systems 120 and the user computing devices 120 may communicate with the travel service 150 via a network 130. Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are known to those skilled in the art of computer communications and thus, need not be described in more detail herein.

The reservation systems 120 may correspond to any systems or devices configured or enabled to allow booking, reservation, or acquisition of travel items. For example, a reservations system 120 may correspond to a centralized reservation system (CRS), a global distribution system (GDS), or any other system where multiple travel item providers, such as airlines, hotels, car rental agencies, cruise lines, bus services, etc., make travel items available for booking, reservation, and/or purchase. In other embodiments, a reservation system 120 may correspond to a system provided by an individual travel item provider (e.g., a specific airline, hotel or hotel chain, car rental agency, cruise line, bus service, etc.). In general, each reservation system may enable other network-based devices, such as devices of the travel service 150 to request information regarding travel items (e.g., availability, price, travel plan, etc.), to search travel items, and to book, acquire, or reserve travel items. Operation of reservation systems is known within the art, and therefore will not be described in more detail herein.

In the illustrated embodiment, the travel service 150 is illustrated as a computer environment including several computer systems that are interconnected using one or more networks. More specifically, the travel service 150 may include a user interface system 156, a reservation systems interface 152, a query processing system 154, a traveler profile data store 158, and a travel item data store 160. While shown in FIG. 1 as distinct systems, one or more of the user interface system 156, reservation systems interface 152, query processing system 154, traveler profile data store 158, and travel item data store 160 may, in some embodiments, be combined into one or more aggregate systems. Further, it will be appreciated by those skilled in the art that the travel service 150 could have fewer or greater components than are illustrated in FIG. 1, including various Web services and/or peer-to-peer network configurations. In some embodiments, the one or more components of the travel service 150 may be implemented by virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. Thus, the depiction of the travel service 150 in FIG. 1 should be taken as illustrative and not limiting to the present disclosure.

Any one or more of the user interface system 156, the reservation systems interface 152, the query processing system 154, the traveler profile data store 158, and the travel item data store 160 may be embodied in a plurality of components, each executing an instance of the respective user interface system 156, reservation systems interface 152, query processing system 154, traveler profile data store 158, and travel item data store 160. A server or other computing component implementing any one of the user interface system 156, the reservation systems interface 152, the query processing system 154, the traveler profile data store 158, and the travel item data store 160 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective user interface system 156, reservation systems interface 152, query processing system 154, traveler profile data store 158, and travel item data store 160. The memory may generally include RAM, ROM, other persistent and auxiliary memory, and/or any non-transitory computer-readable media.

In accordance with embodiments of the present disclosure, the query processing system 154 may be configured to process queries and determine a set of query results (e.g., for presentation to the user computing devices 110 via the user interface system 156). More specifically, the query processing system 154 may utilize geographically-based clustering to detect ambiguous queries, and to present the user computing devices 110 with indicators of each result cluster (e.g., as identifiers of the geographic region in which a cluster is located or of a specific item within a cluster that is likely to be of interest to the user). As will be described below, the query processing system may conduct additional pre- or post-processing on a query to increase the accuracy of results.

In some embodiments, the query processing system 154 may utilize information on travel items obtained from the reservations systems 120. Interaction with the reservation systems 120 may be facilitated by the reservation systems interface 152, which may enable querying for information regarding relevant travel items on the reservation system 120, retrieving information regarding travel items from the reservation system 120, and reserving travel items on behalf of users. In some embodiments, multiple reservation systems interfaces 152 may be provided, each configured to interact with one or more specific reservation systems 120. For example, a first reservation systems interface 152 may interact with an airline-based reservation system 120, while second reservation systems interface 152 may interact with a hotel based reservation system 120. Embodiments of systems and methods for interaction with reservation systems 120 are described within U.S. patent application Ser. No. 12/470,442, filed on May 21, 2009, and entitled "OPTIMIZED SYSTEM AND METHOD FOR FINDING BEST FARE," which is hereby incorporated by reference in its entirety.

The query processing system 154 may further utilize information from the travel item data store 160, which may include various data on relevant travel items. The travel item data store can correspond to any physical data store, collection of physical data stores, or virtual data store implemented by one or more physical data stores, such as hard disk drives (HDDs), solid state drives (SSDs), tape drives, network attached storage (NASs) or any other persistent or substantially persistent storage component. In some instances, data within the travel item data store 160 may be obtained from reservation system 120 (e.g., names, addresses, available booking types, etc.) via the reservation systems interface 152. The travel item data store 160 may further include information generated by the travel service 150 itself, or submitted to the travel service 150 by the user computing devices 110, such as reviews, ratings, pictures, or comments on various travel items. The travel item data store 160 may also include information retrieved or submitted by third party services, such as independent travel item rating services or travel agencies (not shown in FIG. 1). In some instances, the query processing system 154 may utilize information from the travel item data store 160 exclusively or preferentially to information retrieved directly from the reservations system 120, due to delays in communication with the reservation system 120. As such, the travel item data store 160 may, in some instances, function to cache information from the reservation system 120 or other distinct systems (not shown in FIG. 1) for use by the query processing system 154.

Submissions to the query processing system 154 may be submitted by user computing devices 110 via the user interface system 156, which may also transmit query results to the user computing devices 110. Accordingly, the user interface system 156 may facilitate searching, browsing, and acquisition (e.g., by reservation, booking, etc.) of travel items by users via user computing devices 110. In some embodiments, the user interface system 156 may include a network server, such as a web server, for generation of instructions for presentation by recipient devices of network pages (e.g., web pages) facilitating such searching, browsing, and acquisition. One example of a user interfaces for which instructions may be generated by a user interface system 156 will be described in more detail in FIG. 3, below.

The user interface system 156 may further be configured to store, maintain, and acquire information from a traveler profile data store 166. The user information data store 166 may correspond to any persistent or substantially persistent data store, such as one or more hard disk drives (HDDs), solid state drives (SSDs), or network attached storage devices (NASs). The traveler profile data store 166 may store information regarding users, such as a user's name, age, address, date of birth, credit card information, purchase history, and travel reservations, frequent flyer or rewards program information, etc., for use by the travel service 150. As discussed below, information from the traveler profile data store 166 may be utilized to determine one or more preferred regions for a user submitting a query, which may assist in disambiguation of the query.

Figure 2:
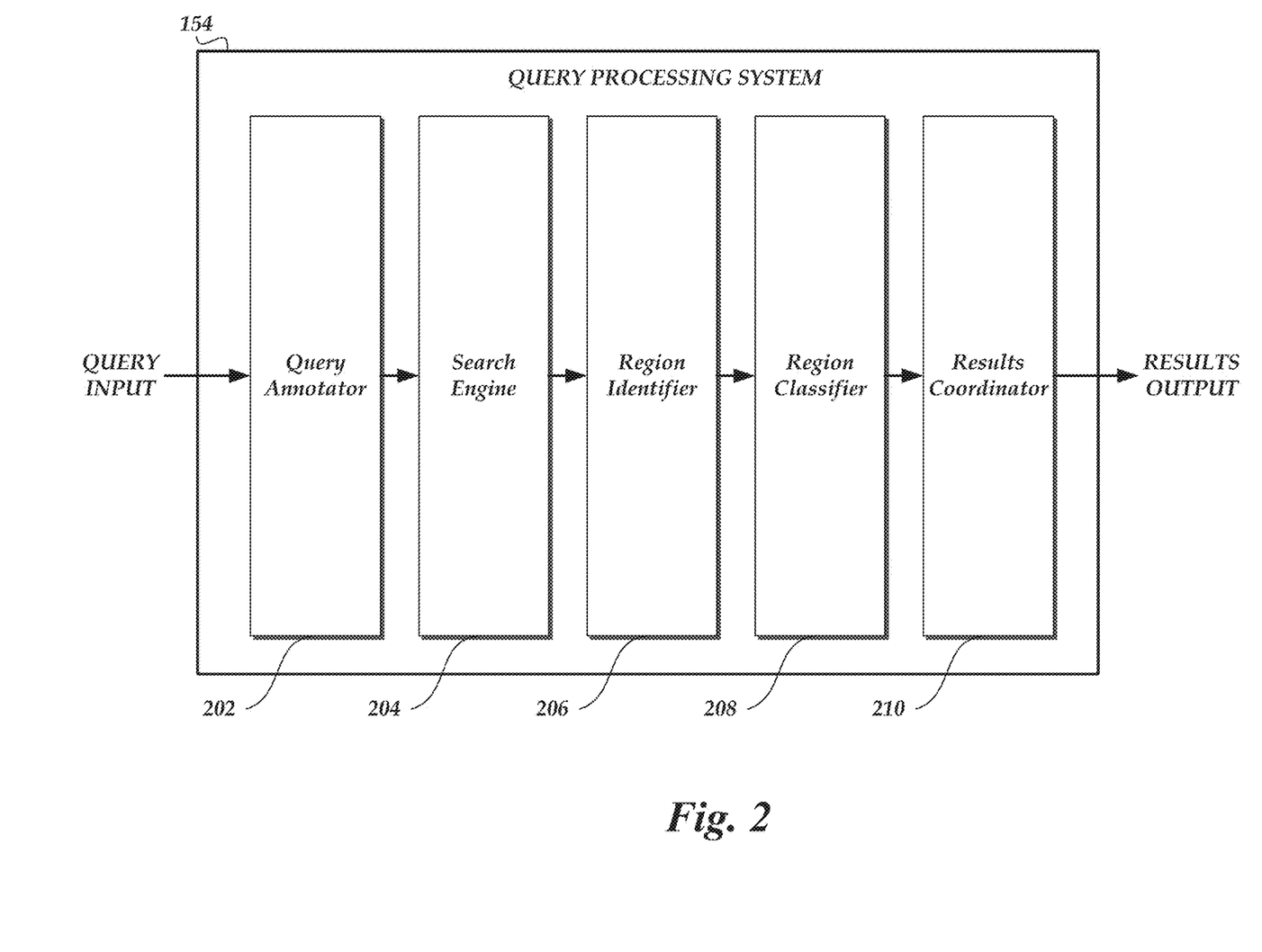
FIG. 2 is an illustrative block diagram of the query processing system included in the travel service of FIG. 1, which may process user queries to detect potential ambiguities based on geographic clustering of results.

Further detail regarding the query processing system 154 is shown in FIG. 2, which is a block diagram depicting illustrative components of the query processing system 154. Each of the components 202-210 may represent a distinct computing device (including at least one physical processor configured to execute computer-executable instructions) within the query processing system 154, or may represent programs, functionalities, code modules or other code executed by at least one processor included in one or more computing devices within the query processing system 154. For the purposes of illustration, these components 202-210 will be discussed with respect to the handling of an example query input into the query processing system 154 (e.g., by a user computing device 110).

A query received by the query processing system 154 may be initially passed into the query annotator 202, where the various terms of the query may be inspected and annotated for later use within the query processing system. In some embodiments, the query annotator 202 may utilize natural language processing techniques, such as those known within the art, to determine whether any terms or series of terms (sometimes referred to as an "n-gram") can be classified into a pre-defined term type. By way of illustration, term types may include (but are not limited to): a type of travel item sought (e.g., hotel, car, flight, activity, etc.), a name of a specific item sought (e.g., a specific hotel name, a brand of hotel, etc.), a geographic location in which an item is sought (e.g., city, county, etc.), geographic descriptors for the geographic location (e.g., beach, mountains, etc.), amenities provided by a desired travel item (e.g., pool, hot tub, meals, fitness center, spa, etc.), service-level descriptors (e.g., luxury, business, economy, etc.), or specific parts of speech (e.g., noun, verb, participle, pronoun, preposition, adverb, conjunction, etc.). As described below, the query processing system 154 may utilize term annotations to determine which terms of a query should be processed at a given stage within the query processing system 154. For example, the query processing system 154 may ignore desired amenities (e.g., pool, spa, meals served) when attempting to locate geographical regions that may include searched-for travel items, since these terms are not likely to be geographically meaningful. As a further example, the query processing system 154 may ignore certain parts of speech, such as prepositions, that are unlikely to be meaningful during processing of the query.

Thereafter, the query processing system 154 may pass the annotated query into the search engine 204, which functions to locate travel items that are potentially relevant to the query. In one embodiment, the search engine 204 may utilize simple term matching to rank and sort potential travel items in response to a query, such that travel items whose description more closely matches the terms of a query are returned in response to the query, and ranked based on the level of correspondence between their relative descriptions and the terms. In another embodiment, the search engine 204 may utilize historical user activity data, such as "clickstream" data, to determine travel items responsive to a given query. For example, the search engine 204 may determine, for a given hotel query, a set of hotels that prior users selected when utilizing the same query, or terms within the same query. The search engine 204 may further rank the set of hotels based on the frequency of prior user selection. In one embodiment, the search engine 204 may correlate search terms with specific travel items by use of a naïve Bayesian classifier. The use of clickstream data to determine relevant query results may enable the search engine 204 to identify relevant results even when a search query and resultant travel item do not share terminology. For example, clickstream data may indicate that specific hotels in New York City, N.Y. are selected by users after searching for "Hotels in the Big Apple," despite the term "Big Apple" not actually occurring in the descriptions of the specific hotels. In some embodiments, clickstream data may be generated by interactions between the user computing devices 110 and the travel service 150 (e.g., as a result of searches made by users on the travel service 150). In another embodiment, clickstream data may be inferred or gathered during referrals to the travel service 150 by third party search engines (not shown), which may notify the travel service 150 of the specific user query utilized by the third party search engine to direct the user to the travel service 150. Additionally or alternatively, the search engine 204 may utilize any number of search algorithms known within the art to locate travel items of potential relevance to a user's query.

In some instances, the search engine 204 may only utilize a subset of terms from the query, which are expected to be relevant to the geographical clustering of the potential results. For example, the search engine 204 may ignore, for the purposes of identifying initial results, terms within the query that specify desired amenities. As will be described below, these terms may later be utilized by the query processing system 154 to rank individual travel items, before such travel items are presented to the user. In some embodiments, the search engine 204 may further process search results or modify the search results. For example, the search engine 204 may prune the search results, such that the results include only the top n travel items potentially relevant to the user's query.

After determining a set of initial search results, the query processing system 154 may pass the initial search results to the region identifier 206, which may cluster the results into a set of regions. In one embodiment, clustering may occur based on a single-pass algorithm, such that a travel item is determined to fall with a previously identified cluster if a location associated with the travel item is within a threshold distance (e.g., 50 miles) of the previously identified cluster, and is otherwise determined to constitute a new cluster. In instances where a travel item is associated with a single geographic location (e.g., the location of a hotel offering an accommodation, the location at which a destination service is provided, the location of a rental car agency), the region identifier 206 may utilize that single geographic location as a location of the travel service. In instances where a travel item is associated with multiple geographic locations (e.g., a flight with both a departure location and return location), the travel item may be considered within a threshold distance of the cluster if any of the multiple geographic locations are within the threshold distinct from the cluster. Distance from a cluster may be determined based on any location within the cluster. In some embodiments, a travel item may be considered within a threshold distance of a previously existing cluster if a location of the travel item is within a threshold distance from a location of any other travel item already existing within the cluster. In other embodiments, a travel item may be considered within a threshold distance of a previously existing cluster if a location of the travel item is within a threshold distance of a centroid of the cluster (e.g., as determined from the average location of each travel item already within the cluster. Such a single-pass clustering algorithm may be beneficial, in that it may be quickly utilized by the query processing system 154 to determine clusters relevant to geographically dispersed items. However, more complex clustering algorithms, such as k-means clustering (which is known within the art) may also be utilized by the region identifier 206 to determine clusters of travel items.

After identifying a number of clusters, the region identifier 206 may further assign a geographic identifier to each cluster. In one embodiment, the region identifier 206 may utilize geographic metadata available to the query processing system 154 (e.g., from the travel item data store 160 of FIG. 1) to identify the most specific geographic identifier applicable to all (or a threshold percentage of) hotels within the cluster. Such metadata may include identify a set of zones, each identifying a geographic region associated with a specific region identifier. In one embodiment, the metadata may be generated based on existing geo-political boundaries, such as neighborhood, city, county, or state boundary lines. In other embodiments, metadata may be manually generated by the travel service 150. In still more embodiments, the travel service 150 may obtain metadata identifying geographic identifiers and corresponding geographic zones or locations from a third party service, such as a geographic information service (GIS), as is known in the art. Using such geographic metadata, the region identifier 206 may compare the locations of travel items within any given cluster to determine identifiers of one or more geographic regions that includes the locations of all or a threshold percentage of travel items within the cluster. Accordingly, a cluster of accommodations for hotels located within the Fremont neighborhood of Seattle, Wash. may be identified as the "Fremont, Seattle, Wash." cluster, while a cluster of accommodations for hotels located in Spokane, Wash. may be identified as the "Spokane, Wash." cluster. In some embodiments, the travel service 150 may also include relative geographic identifiers within the metadata of travel items. For example, one or more travel items may be classified as "near the Space Needle" (an observation tower in Seattle, Wash.). Where the travel items of a cluster are included within multiple regions (e.g., a relative identifier, a neighborhood, and a city) the travel service 150 may select from the multiple regions based on a priority level of each region. Illustratively, regions may be prioritized on the travel service 150 based on a total area included within the region, based on a popularity of the region on the travel service 150 (e.g., based how often users search for travel items corresponding to the region), or both. For example, where travel items of a cluster are located within both the region "Downtown Seattle, Wash." and "Seattle, Wash.," the travel service 150 can use the identifier "Downtown Seattle, Wash." for the cluster due to that regions smaller size and greater popularity among users of the travel service 150. Additionally or alternatively, the travel service 150 may select from multiple regions based on a correspondence between terms used in a user's query and the identifiers of each region. For example, a search for "hotels near the Space Needle" may result in a cluster of hotels identified as "near the Space Needle," rather than as ""in Seattle, Wash.," Due at least in part to the overlap in terms between the search query and the region identifier.

Additionally, the region identifier 206 may sort the determined clusters, to establish a predicted relevancy of each cluster to the search query. In one embodiment, clusters may be sorted based on the travel items determined to fall within the cluster. For example, an initial ranking of each travel item (e.g., as determined by the search engine 204) may be utilized to determine an aggregate or average ranking of travel items within each cluster (such that clusters with including travel items highly ranked by the search engine 204 are ranked above clusters including travel items not highly ranked by the search engine 204). In another embodiment, clusters may be sorted based at least in part on a correspondence between the geographic identifier assigned to the cluster and the query, such that a cluster of hotels identified as geographically "near the Space Needle" is ranked highly for a query including the term "space needle." In yet more embodiments, clusters may be sorted based on the geographic identifiers of the clusters themselves (e.g., such that geographic identifiers that are more popular with users of the travel service 150 are ranked more highly than less popular geographic identifiers, or such that more specific geographic identifiers are rated more highly than less specific geographic identifiers), or based on a preference of the user for a geographic identifier corresponding to at least one cluster (e.g., as determined by profile data of the user).

Thereafter, the query processing system 154 may pass the identified clusters to the region classifier 208, which can attempt to distinguish clusters that are relevant by virtue of their geographic location from clusters that are relevant based on travel items included within the cluster. For example, a query for "Edgewater Hotel" may result in two clusters: a first cluster including the Edgewater Hotel and other nearby hotels in Seattle, Wash., and a second cluster including hotels in and around the borough of Edgewater, N.J. Of these, the first cluster is expected to be relevant based on a specific travel item included within the cluster (the Edgewater Hotel). Accordingly, rather than present a geographic identifier (e.g., "Hotels in Seattle, Wash.") to a user, the cluster can be represented to the user as the specific travel item within the cluster expected to be of interest (e.g., "the Edgewater Hotel in Seattle, Wash."). User selection of the cluster would then result in detailed information regarding the specific travel item. Conversely, the second cluster (of hotels in and around the borough of Edgewater, N.J.) can be represented to a user as a selectable region (e.g., "Edgewater, N.J.") selectable to view a listing of hotel accommodations within that region.

To distinguish between regions that are relevant due to a specific travel items and regions that are themselves relevant, the region classifier 208 may utilize the relevant rankings of the individual travel items within the cluster, as assigned by the search engine 204 (e.g., based on clickstream data, term analysis, or any other search and ranking criteria). In instances where the highest-ranked travel item within a given cluster appears to be much more relevant than the next highest-ranked travel item, it is likely that the cluster is relevant by virtue of that highest-ranked travel item. As such, that cluster can be represented to a user as merely the travel item itself (e.g., as a link to view additional information regarding the specific travel item). Conversely, where all travel items within a cluster are similarly ranked, that cluster may be presented to the user as a geographic identifier (e.g., a specific city), selectable to view travel items within that city. The region classifier 208 may utilize any number of comparisons between the items of a given cluster, in order to distinguish whether an individual travel item within the cluster represents an item of specific interest to the customer. In the instance that individual travel items within a cluster have been assigned a score (e.g., by the search engine 204), examples of comparisons between the items of a cluster include, but are not limited to, the difference in scores between the first and last ranked travel items within the cluster (e.g., as measured as an absolute difference, difference in a logarithmic domain, etc.); the difference in scores between the first and second ranked travel items within the cluster; the ratio of the difference in score between the first and second ranked items within the cluster, as compared to the difference in score between the second and third ranked items within the cluster; and the ratio of the difference in score between the first and second ranked items within the cluster, as compared to the difference in score between second and last ranked items within the cluster. Other factors that the region classifier 208 may use to distinguish between types of cluster (e.g., a regionally relevant cluster or a cluster relevant by virtue of a specific travel item) include the number of clusters generated based on a top n number of search results to the query, an average distance between extracted clusters (e.g., as determined based on a center of the cluster, an edge of the cluster, etc.), a maximum distance between all extracted clusters, and a minimum distance between all extracted clusters.

Additionally or alternatively, types of clusters (e.g., a regionally relevant cluster or a cluster relevant by virtue of a specific travel item) may be distinguished based on a comparison of the query terms input by a user and terms associated with the highest ranked travel item within a cluster. For example, where a search query and a top-ranked travel item share similar terms (e.g., a query for "edgewater hotel" and a travel item named "The Edgewater Hotel"), a cluster's relevance is likely highly linked to that top-ranked travel item. Conversely, where a search query and a top-ranked travel item do not share similar terms (e.g., a query for "Hotels in Seattle, Wash." and a top-ranked travel item of "The Edgewater Hotel"), the cluster is likely relevant generally, and a user may benefit from viewing hotels within the geographic identifier associated with the cluster. In some instances, the similarity of terms between a query and a travel item may be quantized as the proportion of matching terms (or "n-grams") between a query and a travel item identifier (e.g., a name), as compared to the total terms (or "n-grams") in the query. Thus, in one embodiment, the region classifier 208 may determine that a cluster is relevant by virtue of a specific travel item where that travel item and the user's query have a proportion of matching terms over a threshold amount. In some embodiments, cluster types may also be distinguished based on a comparison of query terms to a region identifier for the cluster. For example, a cluster may be determined to be relevant by virtue of its corresponding region when a name of the region closely matches one or more terms within the query. Still further, cluster types may be distinguished based on the use of specific terms or term types within the query. Illustratively, regional identifiers for clusters may be more likely to be relevant to a query containing a plural term (e.g., "hotels" as opposed to "hotel") than specific travel item identifiers. In some embodiments, each of the metrics described above may be quantized, and additional metrics may be derived from comparisons of such quantizations. For example, the query processing system 154 may assign a score to the similarity of a cluster's regional identifier and the terms used in a query, as well as a score to the similarity of the top-search result in a cluster to the those terms. An additional metric may then be created by comparing these two scores. Additional metrics are possible and contemplated within the scope of this disclosure. The specific metrics (or combination thereof) used to distinguish between cluster types may in some instances be determined based on the use of a machine learning algorithm to process a training data set including queries and corresponding results clusters with known relevance types (e.g., relevant based on a geographic identifier or based on the top-travel item within the cluster).

Thereafter, the query processing system 154 may pass the identified and classified clusters to the results coordinator 210. If multiple clusters have been identified, the results coordinator 210 may transmit (e.g., via the user interface system 156) a request to the user to select one of the clusters, as identified either by a geographic identifier or a top-ranked travel item within the cluster. If a user selects a cluster identified by a top-ranked travel item, such as a hotel, the user can be directed immediately to a detail page allowing reservations for the hotel to be made. If a user selects a cluster identified by a geographic identifier, the results coordinator 210 may present a listing of travel items available within the cluster. In some instances, the results coordinator 210 may re-sort or re-rank travel items within the cluster. For example, where query terms tagged as amenities (e.g., spa, fitness center, etc.) were previously ignored by the search engine 204, the results coordinator may reevaluate travel items within the cluster based on the availability of those amenities for each travel item. In some instances, the results coordinator may conduct a new search, limited to the geographic region identified by the cluster, to determine a set of travel items to present to the customer.

In the instance that only a single cluster was previously identified by the query processing system 154, the results coordinator 210 may proceed as if a user has selected that single cluster. Thus, if the single cluster is determined to be relevant to the query based on a top-ranked travel item, the user may be directed to a detail page of that travel item. If the single cluster is determined to be relevant based on a geographical region, the results coordinator 210 may present a listing of travel items within the cluster (as potentially resorted or re-ranked based on the initial query), or may present the results of a new search for travel items within the geographical region.

In the manner described above, the query processing system 154 may process unstructured queries to determine potential geographic ambiguities within the query, and to allow the user to select an intended travel item or geographic region. Thus, the query processing system 154 enables an improvement in the speed, efficiency, and accuracy of searching for information related to travel items, as compared to traditional searching algorithms.

Figure 3:
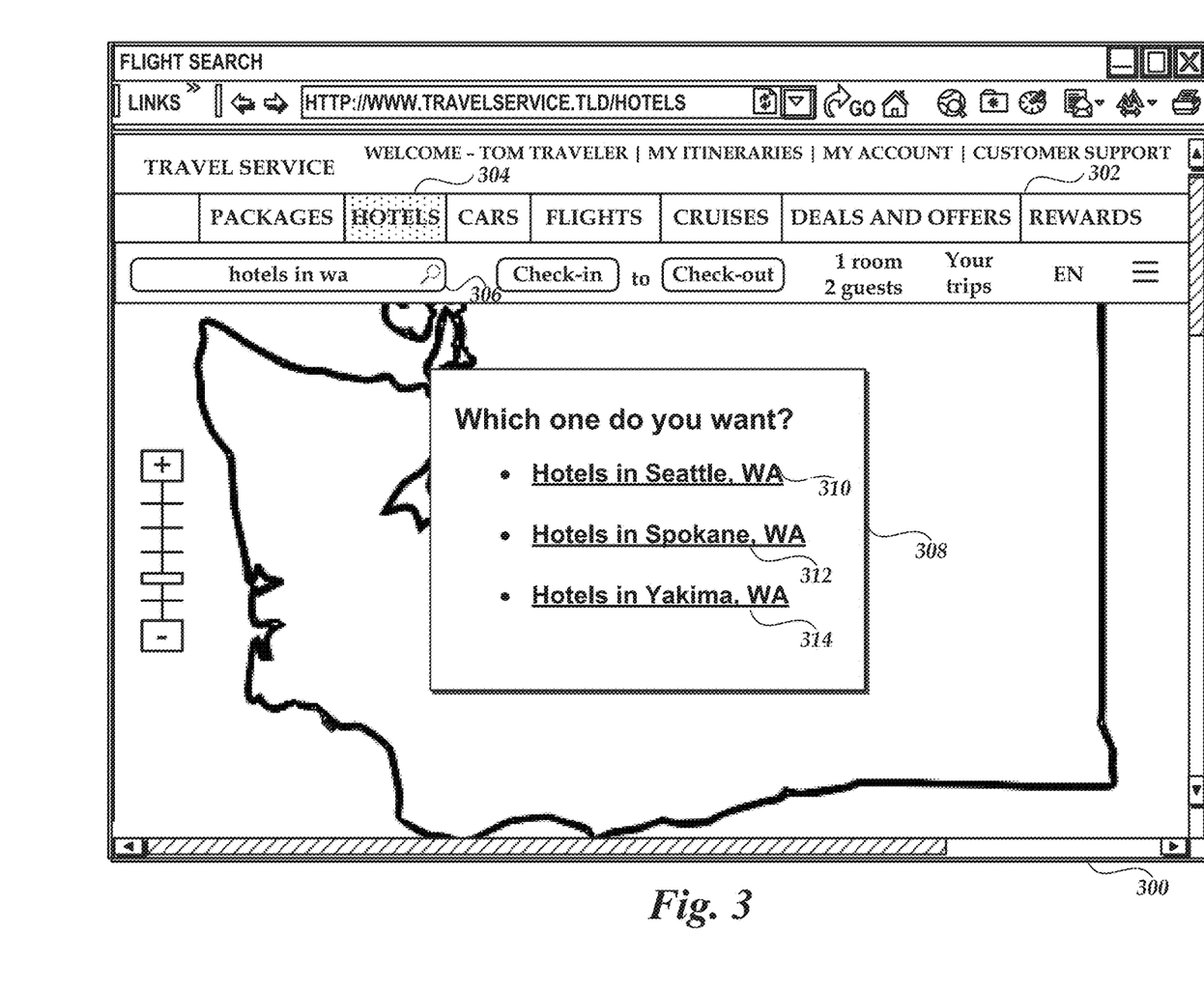
FIG. 3 is an illustrative user interface that may be displayed on a user computing device to notify the user of a potentially ambiguous query and to provide results of the query based on the detected ambiguity.

With reference to FIG. 3, an illustrative example of a user interface 300 for enabling disambiguation of a search query utilizing geographical clusters is displayed. In this example, the user interface 300 is generated by a browser application (e.g., a "web browser") executing on a user computing device 110, based on instructions (e.g., and hypertext markup language [HTML] document) received from the travel service 150. The user interface 300 can enable a user computing device 110 to submit queries to the travel service, to select an appropriate cluster of results in instances where such queries are determined to be ambiguous, to view and acquire available travel items in response to a submitted travel query, and to view travel package recommendations generated based at least in part on the submitted travel query. In the illustrated example of FIG. 3, a user identified as "Tom Traveler" has accessed the travel service 150. To enable the user to navigate among various interfaces of the travel service 150, the user interface includes a navigation panel 302, which directs the traveler to various other features offered by the travel service 150. Illustratively, units of text within the navigation panel 302 may correspond to interactive links, which modify or change the user interface when selected. In the current example, Tom Traveler has selected link 304, "Hotels." Based on this selection, the user interface system 156 has returned the content for user interface 300. The user may be enabled to view alternative user interfaces by selection of alternative links within the navigation panel 302. For example, the user may view the alternative interfaces related to other types of travel items by selecting the portions of the navigation panel titled "Packages," "Cars," "Flights," etc.

By use of the user interface 300, the traveler computing device 110 may submit a query to the travel service 150 by use of the search box 306. In the current example, the user has submitted the unstructured query text "hotels in wa." On receiving this query, the travel service 150 may pass the query text (along with any other additional information, such as profile information of the user) to the query processing system 154. As described above, the query processing system 154 may locate a set of results for the query (e.g., using term matching, clickstream classification, or other searching algorithms), and process the results to geographically cluster the travel items included within the results.

Figure 4:
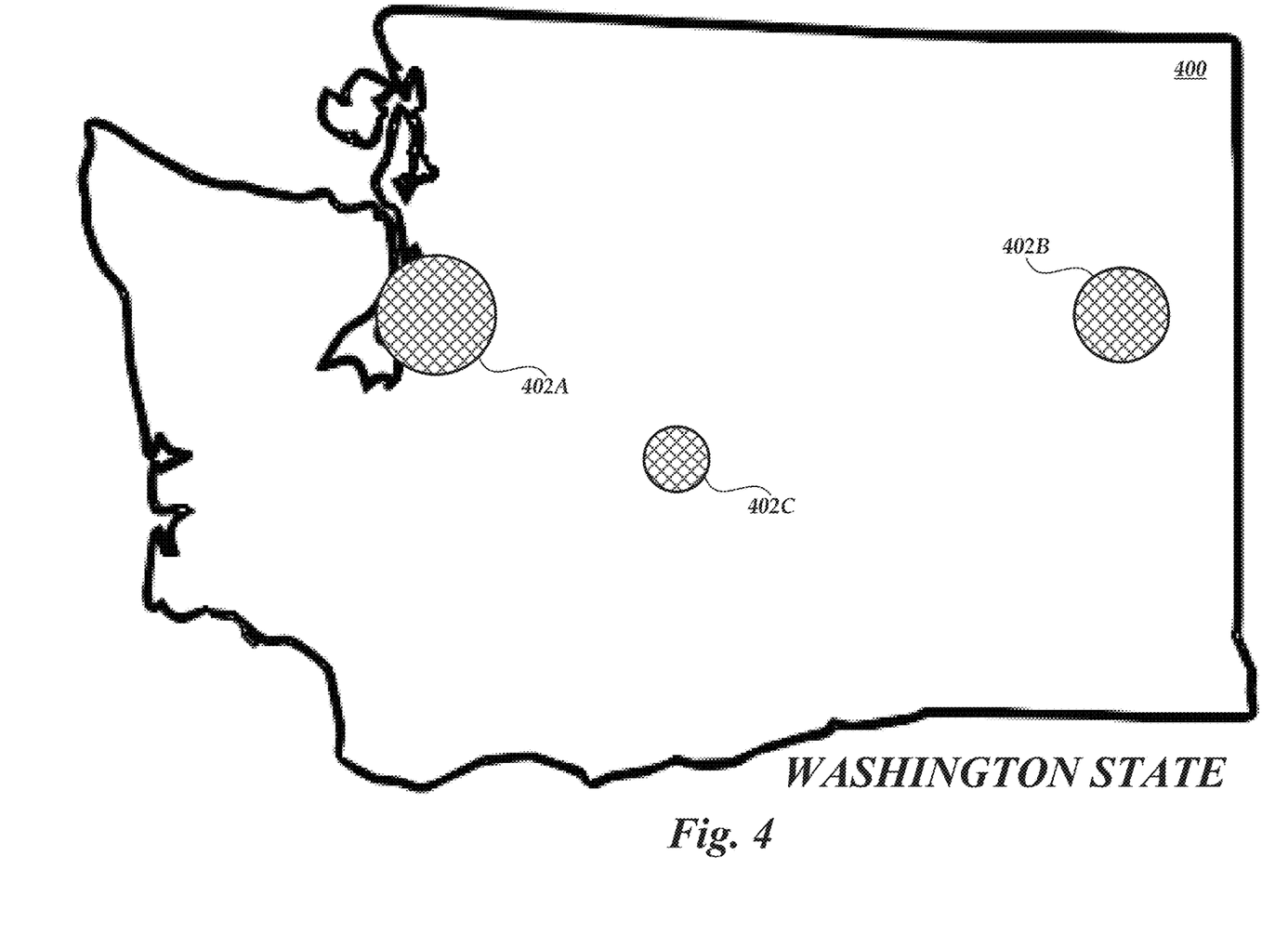
FIG. 4 is an illustrative visualization of geographic clustering of search results, which may indicate an ambiguity in the corresponding query.

One example of potential geographical clusters for the query "hotels in wa" is shown in FIG. 4. As shown in FIG. 4, potential travel items related to the query "hotels in wa" may be spread across the Washington State region 400. It should be noted that the specific clusters shown in FIG. 4 are illustrative in nature only, and that potential travel items related to the query "hotels in wa" may also include travel items located outside of the Washington State region 400 (e.g., in Washington, D.C.). To disambiguate the query, the query processing system 154 can utilize a clustering algorithm (such as those described above) to cluster the results into three clusters 402A, 402B, and 402C. While only three clusters are shown in FIG. 4, any number of clusters may be identified by the query processing system 154. In some instances, the query processing system 154 may "prune" clusters, such that clusters having a low potential relevancy (e.g., as determined by the aggregate or average scores of travel items within the cluster) are not selected for further processing, thus reducing the number of clusters represented to a user. In the example of FIG. 4, each cluster is associated with a pre-determined geographical region in the State of Washington, such that each travel item within the cluster is associated with that geographical region. Specifically, the travel items within cluster 402A are illustratively associated with the "Greater Seattle Area" region; the travel items within cluster 402B are illustratively associated with the "Spokane" region; and the travel items in cluster 402C are illustratively associated with the "Yakima Valley" region.

Because most travelers have a relatively specific travel location in mind, it is unlikely that a user would benefit from having hotels from each of clusters 402A-C presented simultaneously. Moreover, if the user was actually interested in traveling to a less popular or otherwise less highly-ranked region, it is possible that an initial set of results selected from each of the clusters 402A-C would not include any travel items from the user's desired region, thus requiring the user to request additional search results (e.g., by moving to through subsequent "network pages" of results), to "narrow" their search terms (e.g., by manually specifying the region in which they are interested), or to resubmit a different search query. Each of these alternative options is both detrimental to the user's experience, and decreases the speed, accuracy and efficiency at which the travel service 150 may operate.

To address these issues, aspects of the present disclosure enable each of the three clusters 402A-C to be represented to the user as a group, rather than as individual travel items within the cluster. As noted above, the query processing system 154 may be configured to identify an expected relevancy of each cluster 402A-C, as either relevant by virtue of its geographical location or relevant by virtue of a top-ranked travel item within the cluster 402A-C. In the example of FIG. 4, it is assumed that each of the clusters 402A-C is determined by the query processing system 154 to be relevant by virtue of its geographical location. Thus, in order to disambiguate the query "hotels in wa," the travel service 150 may request that the user select one of the geographic regions represented by the clusters 402A-C.

One example of a request to select from a number of identified clusters is shown within FIG. 3. Specifically, FIG. 3 includes a prompt 308 generated by the travel service 150 to request that the user select from three geographic identifiers 310-314 identifying regions in which travel items resulting from the query "hotels in wa" are located. Each of the geographic identifiers 310-314 corresponds to one of the clusters 402A-C shown in FIG. 4 (where identifier 310, "Hotels in Seattle, Wash.," corresponds to cluster 402A; identifier 312, "Hotels in Spokane, Wash.," corresponds to cluster 402B; and identifier 314, "Hotels in Yakima, Wash.," corresponds to cluster 402C). Through the user interface 300, a user may select one of the geographic identifiers 310-314 to receive additional information regarding the selected identifier. In one embodiment, selection of an identifier may result display of a set of travel items included within the cluster represented by the identifier. In another embodiment, selection of an identifier may result in a new query being generated on behalf of the user (e.g., sharing the previously submitted unstructured query terms, but being limited to the region identified by the selected geographic identifier). Various systems and methods for displaying results to a travel item query are known within the art, and will not be described in detail herein.

While each cluster 402A-C is represented by a geographic identifier within FIG. 3, in some embodiments, clusters may alternatively be represented by a top-ranked travel item located within the cluster (e.g., as the name of that travel item). Moreover, identifiers for different types of identified clusters may be intermixed within the same prompt. For example, a query for "Edgewater Hotel" may result in a prompt requesting selection between "The Edgewater Hotel, Seattle, Wash." (representative of a cluster that is relevant based on a top-ranked travel item in that cluster) and "Hotels in the borough of Edgewater, N.J." (representative of a cluster that is relevant based on a geographic region in which travel items within the cluster are located). In instances where a customer selects an identifier corresponding to a specific travel item (e.g., "The Edgewater Hotel, Seattle, Wash."), the user may be automatically directed to an information page regarding the specific travel item (which may enable to user to reserve, book, or otherwise acquire the travel item).

Figure 5A:
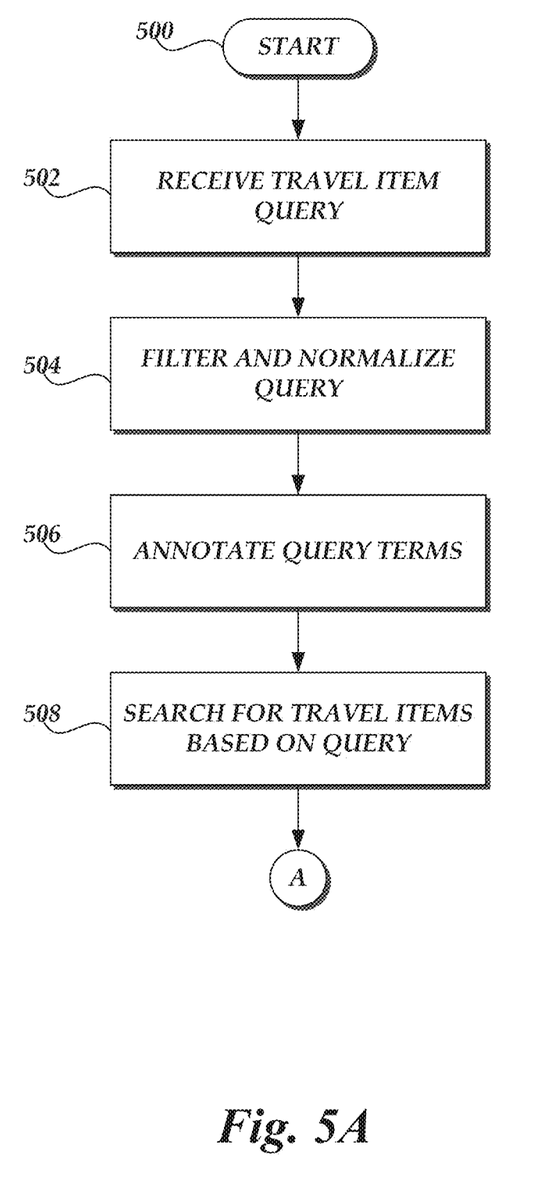
FIGS. 5A and 5B are a flow diagram for processing user-submitted queries that may include ambiguities, for detecting such ambiguities based on geographic clustering of results, and for providing results of the query to the user.
Figure 5B:
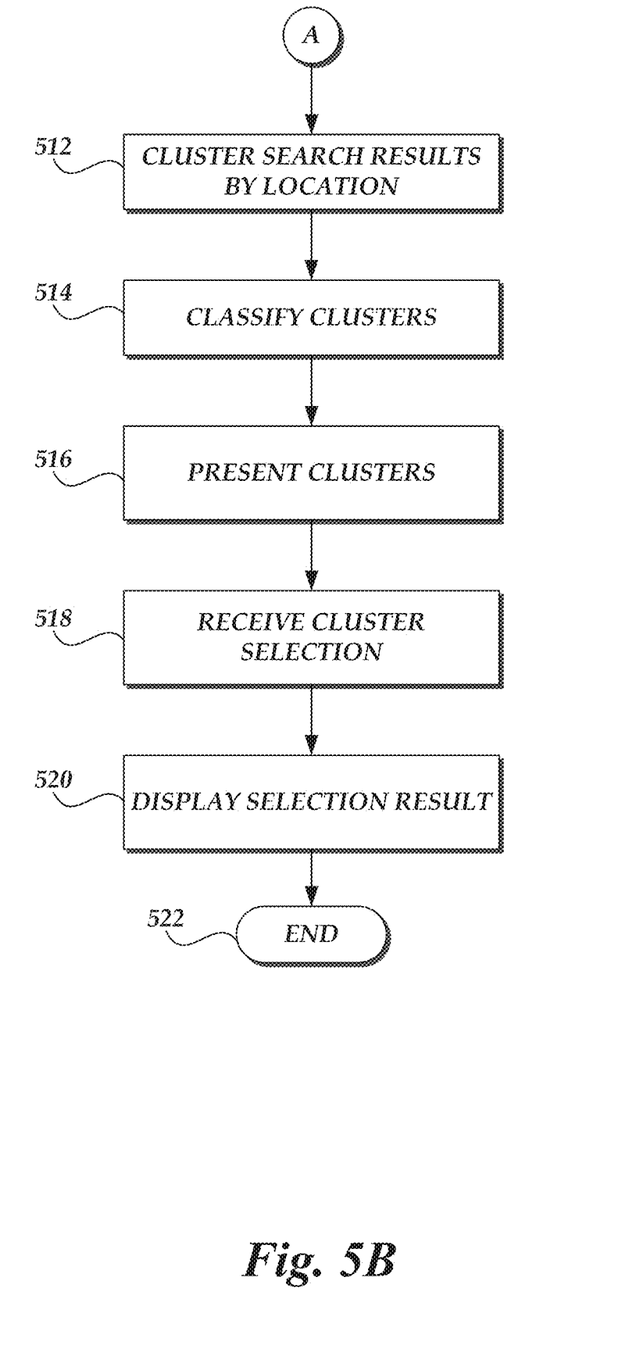

With reference to FIGS. 5A and 5B, one illustrative routine 500 for disambiguating search queries based on geographic clustering of potential results will be described. The illustrative routine 500 may be carried out, for example, by the query processing system 154, in conjunction with additional components of the travel service 150. The routine 500 begins at block 502, where the query processing system 154 receives a travel item query. Illustratively, the query may be received from a user, utilizing a user computing device 110 of FIG. 1, via submission to the user interface 300 of FIG. 3. The routine 500 continues at block 504, where the query processing system 154 may pre-process, filter, and/or normalize the query to facilitate further processing. Illustratively, block 504 may include normalizing the query by removing capitalization, excess spaces, or other ignored formatting or characters, executing pre-defined regular expressions on the query, grouping multiple words into a single term (e.g., grouping the words "new" and "york" into a single term, "new york"), or otherwise executing known processes on the query to prepare the query for further use by the query processing system 154.

Thereafter, the routine 500 continues at block 506, where terms of the query can be annotated to identify a "type" for the term, such as: a type of travel item sought (e.g., hotel, car, flight, activity, etc.), a name or descriptor of a specific item sought (e.g., a specific hotel name, a brand of hotel, etc.), a geographic location in which an item is sought (e.g., city, county, etc.), geographic descriptors for the geographic location (e.g., beach, mountains, etc.), amenities provided by a desired travel item (e.g., pool, hot tub, meals, fitness center, spa, etc.), service-level descriptors (e.g., luxury, business, economy, etc.), or specific parts of speech (e.g., noun, verb, participle, pronoun, preposition, adverb, conjunction, etc.). In one embodiment, block 506 may include execution of a natural language processing algorithm by the query processing system 154, which processes a query to annotate individual terms within the query with a determined term type. In some embodiments, terms of the query annotated with one or more pre-defined types, such as propositions, may be removed from the query before the routine 500 continues. In other embodiments, terms of the query annotated with one or more pre-defined types may be maintained within the query, but ignored in specific portions of the routine 500. For example, the query processing system 154 may ignore terms annotated as "amenities" when determining an initial set of potential results from which to derive geographically-based clusters.

At block 508, the query processing system 154 implements a search for a set of potential results to the query. In one embodiment, the query processing system 154 may utilize term-matching, to determine travel items whose descriptions include terms also within the query. In another embodiment, the query processing system 154 may utilize historical usage data of users of the travel service 150 (e.g., as represented by "clickstream" data obtained by the travel service 150. In one embodiment, the query processing system 154 may utilize naïve Bayesian classification to rank or score travel items according to a query. For example, the query processing system 154 may attempt to determine, for any given travel item, the probability of that travel item being selected by a user in response to a query. This probability may be represented in the form of P(T|Q), where 'T' represents a travel item, and 'Q' represents a query. This probability may be represented by the formula:

$$P(T|Q)=P(Q|T)*P(T)$$

where P(T) represents the probability of a given travel item being selected, and may be calculated as the total number of occurrences of user-selection of the travel item within the relevant data divided by the total number of queries within the relevant data. The function P(Q|T) may be computed, in turn, according to the equation:

$$P(Q|T)=P(W_1|T)*P(W_2|T) \ldots *P(W_n|T)$$

where $W_{1 \ldots n}$ represent the series of terms (or "n-grams") within a query, and P(Wn|T) represents the percentage of times that a given word Wn occurs in an individual query within all queries resulting in selection of the travel item T. Thus, by analyzing clickstream data to determine correspondences between past queries and individual travel items, the query processing system 154 may score or rank the individual travel items in response to newly submitted queries.

Various additional mechanisms and algorithms for locating travel items in response a query are known within the art and may be utilized additionally or alternatively to those described above. In some instances, the query processing system 154 may communicate with distinct systems in order to determine search results of a query. For example, the query processing system 154 may communicate with third party search engines, such as those provided by reservation systems 120 or other systems not shown in the figures to determine search results for use in conjunction with the routine 500. Thus, the search mechanisms and algorithms described above are intended to be illustrative and not exhaustive in nature.

Thereafter, the routine 500 continues of FIG. 5B, at block 512. Specifically, at block 512, the query processing system 154 utilizes the previously established set of search results to determine one or more clusters of travel items responsive to the query, based on the geographic location of each travel item. Illustratively, geographic location may be established based on latitude and longitude coordinates of a travel item, address of a travel item, or other indicator of the travel item's geographic positioning. Geographic locations of a travel item may be pre-determined by the travel service 150, or may be determined by the query processing system 154 during implementation of the routine 500 (e.g., utilizing information retrieved from the travel item data store 160, the reservation systems 120, or other systems). The query processing system 154 may cluster travel items based on any variety of clustering algorithms. In one embodiment, the query processing system 154 utilizes a single pass clustering algorithm, such that a given travel item is identified as associated with an existing cluster if the travel item is located within a threshold distance (e.g., 100 kilometers) from the existing cluster (e.g., as represented by a center point of the cluster, a border of the cluster, one or more travel items within the cluster, etc.), and is otherwise determined to constitute a new cluster. In another embodiment, the query processing system 154 utilizes the k-means clustering algorithm. Various additional clustering algorithms are known within the art and therefore will not be described in detail herein.

In some embodiments, the query processing system 154 may further prune clusters, by removing clusters unlikely to be relevant to the users search. In one embodiment, clusters are pruned based on a score of the cluster, as determined by at least one of the average or total score of travel items included within the cluster. Illustratively, scores for individual travel items may be determined during the initial search described above with respect to block 508. For example, the query processing system 154 may prune (e.g., ignore) clusters whose score represents less than a threshold percentage of the total score of all determined clusters. As another example, the query processing system 154 may rank the clusters by score, and prune any clusters below a pre-determined rank.

Thereafter, the routine continues at block 514, where the query processing system 154 classifies the clusters to determine their expected relevance. In one embodiment, the query processing system 154 may attempt to determine whether a given cluster is likely relevant based on a geographical identifier attributed to the query (e.g., a specific neighborhood, city, etc.), or whether the cluster is likely relevant due to a specific travel item included within the clusters. As described above, the query processing system 154 may distinguish between types of clusters based on a number of criteria, including but not limited to: the similarity between terms of the query and terms of a top-ranked travel item within a cluster; the number travel items within the top n overall search results that are included within the query; the difference in scores between the first and last ranked travel items within the cluster; the difference in scores between the first and second ranked travel items within the cluster; the ratio of the difference in score between the first and second ranked items within the cluster, as compared to the difference in score between the second and third ranked items within the cluster; and the ratio of the difference in score between the first and second ranked items within the cluster, as compared to the difference in score between second and last ranked items within the cluster. In one embodiment, machine learning techniques may be utilized to determine the specific criteria utilized to distinguish between types of clusters.

Thereafter, the routine 500 continues at block 516, where the query processing system 154 can present a user with representations of each identified cluster. One example of a user interface to present representations of clusters is discussed above with respect to FIG. 3. Illustratively, where a cluster is determined to be relevant based on a geographic region corresponding to the cluster, the cluster can be presented to the customer by a geographic identifier associated with the cluster (e.g., a neighborhood, city, or region in which all or a threshold percentage of the travel items within the cluster are located). Where a cluster is determined to be relevant based on a top-ranked travel item within the cluster, the cluster can be presented to the user as a name or other identifier of that top ranked travel item.

At block 518, the query processing system 154 receives a user selection of a presented cluster (e.g., as input through a browser application executed on the user computing device 110). Illustratively, selection of a presented cluster may include selection of a hyperlink (e.g., link within an HTML document) corresponding to the presented cluster. Thereafter, at block 520, the query processing system 154 displays a result of the selected cluster (e.g., by returning an HTML document or portion of an HTML document corresponding to a selected link). Illustratively, selection of a cluster represented by a geographic identifier (e.g., a neighborhood, city, or region identifier) may result in a display of travel items matching the user's submitted query and located within the geographic identifier. Similarly, a selection of a cluster represented by an identifier of an individual travel item (e.g., the name of a top-ranked travel item within the cluster) may result in a display of information regarding the individual travel item, and an interface enabling the user to book or reserve the travel item. Thus, by selection of a cluster identified by the query processing system 154, the user may be presented with information regarding a specific, disambiguated portion of results initially identified in response to their potentially ambiguous query. The routine 500 may then end at block 522.

The various illustrative logical blocks, routines, and algorithms described in connection with the embodiments disclosed herein can be implemented as electronic hardware or computer software executing on electronic hardware. To illustrate this, various illustrative components, blocks, modules, and steps have been described above generally in terms of their functionality. Whether such functionality is implemented as hardware or software executed via hardware depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module may generally correspond to a collection of computer-executable instructions enabling a computing device to implement a desired functionality. Software modules can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for disambiguating travel queries, the computer-implemented method implemented by one or more computing devices configured with specific executable instructions and comprising:
   receiving a travel item query from a user computing device associated with a user;
   identifying a plurality of travel items in response to the travel item query;
   determining a geographic location for each of the plurality of travel items;
   clustering the plurality of travel items according to their respective geographic locations to identify at least two travel item clusters, each travel item cluster of the at least two travel item clusters including a set of travel items from the plurality of travel items;
   determining that an expected relevance of a first travel item cluster of the at least two travel item clusters is based at least in part on a geographic region corresponding to the first travel item cluster, wherein the expected relevance for the first travel item cluster is determined based at least in part on a comparison of one or more terms submitted by the user in the travel item query and a geographic identifier of the geographic region corresponding to the first travel item cluster, which comparison determines similarity between one or more terms submitted by the user in the travel item query and a geographic identifier of the geographic region corresponding to the first travel item cluster;
   determining that an expected relevance of a second travel item cluster of the at least two travel item clusters is based at least in part on an identifier of a travel item within the second travel item cluster, wherein the expected relevance for the second travel item cluster is determined based at least in part on a comparison of the one or more terms submitted by the user in the travel item query and an identifier of the travel item within the second travel item cluster, which comparison determines a similarity between the one or more terms submitted by the user in the travel item query and the identifier of the travel item within the second travel item cluster;
   transmitting an identifier for each travel item cluster of the at least two travel item clusters to the user computing device for presentation to the user, wherein the identifier for the first travel item cluster is the geographic identifier of the geographic region corresponding to the first travel item cluster, and wherein the identifier for the second travel item cluster is the identifier of the travel item within the second travel item cluster;
   receiving, from the user computing device, a selection of a travel item cluster from the at least two travel item clusters; and
   transmitting to the user computing device information regarding the set of travel items included in the selected travel item cluster for presentation to the user.

2. The computer-implemented method of claim 1, wherein the similarity between the one or more terms submitted by the user in the travel item query and the geographic identifier of the geographic region corresponding to the first travel item cluster is based at least in part on a proportion of matching terms between the travel item query and the geographic identifier.

3. The computer-implemented method of claim 1, wherein the similarity between the one or more terms submitted by the user in the travel item query and the identifier of the travel item within the second travel item cluster is based at least in part on as a proportion of matching terms between the travel item query and the identifier of the travel item within the second travel item cluster.

4. The computer-implemented method of claim 1 further comprising:
   assigning a first score to the similarity between the one or more terms submitted by the user in the travel item query and the geographic identifier of the geographic region corresponding to the first travel item cluster; and
   assigning a second score to the similarity between the one or more terms submitted by the user in the travel item query and an identifier of a travel item within the first travel item cluster;
   wherein determining that the expected relevance of the first travel item cluster of the at least two travel item clusters is based at least in part on the geographic region corresponding to the first travel item cluster comprises determining that the first score is greater than the second score.

5. The computer-implemented method of claim 1, wherein a travel item comprises at least one of an accommodation, ground transportation, activity, tour, day trip, or destination service.

6. The computer-implemented method of claim 1, wherein the travel item query is a freeform text query.

7. The computer-implemented method of claim 1 further comprising:
   identifying one or more items within the travel item query corresponding to a pre-determined part-of-speech; and
   removing the one or more terms from the travel item query.

8. The computer-implemented method of claim 1 further comprising identifying the geographic region for each travel item cluster as a region that encompasses geographic locations of at least a threshold percentage of individual travel items within the respective travel item cluster, and wherein the geographic region for each travel item cluster is determined based at least in part on the geographic locations of the individual travel items within the respective travel item cluster.

9. A system comprising:
   a data store including geographic location information for individual travel items of a plurality of travel items; and
   a first computing device comprising a processor coupled to the data store and in communication with the data store, the first computing device configured with computer-executable instructions that, when executed, cause the first computing device to at least:
   receive a query from a second computing device associated with a user;
   identify the plurality of travel items from the data store that are responsive to the query received from the second computing device associated with the user;
   determine, from the geographic location information, a geographic location for each of the plurality of travel items;
   cluster the plurality of travel items according to their respective geographic locations to identify at least two travel item clusters, each travel item cluster of the at least two travel item clusters including a set of travel items from the plurality of travel items;
   determine that an expected relevance of a first travel item cluster of the at least two travel item clusters is based at least in part on a geographic region corresponding to the first travel item cluster, wherein the expected relevance for the first travel item cluster is determined based at least in part on a comparison of one or more terms submitted by the user in the query and a geographic identifier of the geographic region corresponding to the first travel item cluster, which comparison determines a similarity between one or more terms submitted by the user in the query and a geographic identifier of the geographic region corresponding to the first travel item cluster;

determine that an expected relevance of a second travel item cluster of the at least two travel item clusters is based at least in part on an identifier of a travel item within the second travel item cluster, wherein the expected relevance for the second travel item cluster is determined based at least in part on a comparison of the one or more terms submitted by the user in the query and an identifier of the travel item within the second travel item cluster, which comparison determines a similarity between the one or more terms submitted by the user in the query and the identifier of the travel item within the second travel item cluster;

transmit an identifier for each travel item cluster of the first and second travel item clusters to the second computing device;

receive from the second computing device a selection of the first travel item cluster from the first and second travel item clusters; and transmit to the other computing device information regarding the set of travel items included in the first travel item cluster.

10. The system of claim 9, wherein the expected relevance of the first travel item cluster is based at least partly on detecting use of a plural term in the query.

11. The system of claim 9, wherein the plurality of travel items in each of the at least two travel item clusters are ranked, and wherein the travel item within the second travel item cluster is a top-ranked travel item within the second travel item cluster.

12. The system of claim 11, wherein the plurality of travel items in each of the at least two travel item clusters are ranked independently of terms within the query corresponding to a term type ignored during an initial ranking, and wherein instructions further cause the first computing device, in response to the selection of a travel item cluster from the at least two travel item clusters, to re-rank the plurality of travel items in the first travel item cluster based at least in part on the one or more terms within the query corresponding to the term type ignored during the initial ranking.

13. The system of claim 9, wherein the computer-executable instructions cause the first computing device to at least identify the plurality of travel items from the data store as responsive to the query based at least in part on processing one or more terms of the query according to a naive Bayesian classifier.

14. The system of claim 13, wherein the naive Bayesian classifier is based at least in part on clickstream data associating the one or more terms of the query to the plurality of travel items.

15. Non-transitory computer-readable media including computer-executable instructions that, when executed by a computing system comprising a processor, cause the computing system to at least:
receive a query from a computing device associated with a user;
identify a plurality of travel items responsive to the query;
determine a geographic location for each of the plurality of travel items;
cluster the plurality of travel items according to their respective geographic locations to identify at least two travel item clusters, each travel item cluster of the at least two travel item clusters including a set of travel items from the plurality of travel items;
determine that an expected relevance of a first travel item cluster of the at least two travel item clusters is based at least in part on a geographic region corresponding to the first travel item cluster, wherein the expected relevance for the first travel item cluster is determined based at least in part on a comparison of one or more terms submitted by the user in the query and a geographic identifier of the geographic region corresponding to the first travel item cluster, which comparison determines a similarity between one or more terms submitted by the user in the query and a geographic identifier of the geographic region corresponding to the first travel item cluster;
determine that an expected relevance of a second travel item cluster of the at least two travel item clusters is based at least in part on an identifier of a travel item within the second travel item cluster, wherein the expected relevance for the second travel item cluster is determined based at least in part on a comparison of the one or more terms submitted by the user in the query and an identifier of the travel item within the second travel item cluster, which comparison determines a similarity between the one or more terms submitted by the user in the query and the identifier of the travel item within the second travel item cluster;
transmit an identifier for each of a first travel item cluster and a second travel item cluster of the at least two travel item clusters to the computing device;
receive from the computing device a selection of the first travel item cluster; and
transmit to the computing device information regarding the set of travel items included in the first travel item cluster.

16. The non-transitory computer-readable media of claim 15, wherein the expected relevance for each travel item cluster is based at least partly on determining that the set of travel items in each travel item cluster contains a number of top-ranked search results responsive to the query.

17. The non-transitory computer-readable media of claim 15, wherein the computer-executable instructions further cause the computing device to at least rank the set of travel items included in the first travel item cluster, and wherein the information regarding the set of travel items included in the first travel item cluster represents the set of travel items included in the first travel item cluster according to their respective rankings.

18. The non-transitory computer-readable media of claim 17, wherein the computer-executable instructions further cause the computing device to at least:
identify the one or more terms within the query corresponding to desired amenities; and
rank the first set of travel items included in the first travel item cluster based at least in part on the desired amenities.

19. The non-transitory computer-readable media of claim 15 further comprising:
assigning a first score to the similarity between the one or more terms submitted by the user in the query and the geographic identifier of the geographic region corresponding to the first travel item cluster; and assigning a second score to the similarity between the one or more terms submitted by the user in the query and an identifier of a travel item within the first travel item cluster;

wherein determining that the expected relevance of the first travel item cluster of the at least two travel item clusters is based at least in part on the geographic region corresponding to the first travel item cluster comprises determining that the first score is greater than the second score.

20. The non-transitory computer-readable media of claim 15, wherein the plurality of travel items in each of the at least two travel item clusters are ranked independently of terms within the query corresponding to a term type ignored during an initial ranking, and wherein instructions further cause the computing system, in response to the selection of a travel item cluster from the at least two travel item clusters, to re-rank the plurality of travel items in the first travel item cluster based at least in part on the one or more terms within the query corresponding to the term type ignored during the initial ranking.

* * * * *